US010220576B2

(12) United States Patent
Szwedka

(10) Patent No.: US 10,220,576 B2
(45) Date of Patent: Mar. 5, 2019

(54) METHOD AND DEVICE FOR PRODUCING A THREE-DIMENSIONAL OBJECT IN LAYERS

(71) Applicant: EOS GmbH Electro Optical Systems, Krailling (DE)

(72) Inventor: Gregor Szwedka, Munich (DE)

(73) Assignee: EOS GmbH Electro Optical Systems, Krailling (DE)

(*) Notice: Subject to any disclaimer, the term of this patent is extended or adjusted under 35 U.S.C. 154(b) by 654 days.

(21) Appl. No.: 14/412,640

(22) PCT Filed: Jul. 5, 2013

(86) PCT No.: PCT/EP2013/064287
§ 371 (c)(1),
(2) Date: Jan. 2, 2015

(87) PCT Pub. No.: WO2014/006192
PCT Pub. Date: Jan. 9, 2014

(65) Prior Publication Data
US 2015/0142158 A1 May 21, 2015

(30) Foreign Application Priority Data

Jul. 6, 2012 (DE) .......................... 10 2012 013 318

(51) Int. Cl.
*B29C 64/40* (2017.01)
*B29C 67/00* (2017.01)
(Continued)

(52) U.S. Cl.
CPC ........ *B29C 67/0088* (2013.01); *B29C 64/386* (2017.08); *B29C 64/40* (2017.08); *B33Y 50/02* (2014.12)

(58) Field of Classification Search
CPC .... B22F 3/1055; B22F 3/008; B22F 2999/00; B22F 2003/1056; B22F 2003/11;
(Continued)

(56) References Cited

U.S. PATENT DOCUMENTS 5,904,890 A * 5/1999 Lohner .............. B29C 67/0077
264/308
6,042,774 A 3/2000 Wilkening et al.
(Continued)

FOREIGN PATENT DOCUMENTS

DE          19511772      10/1996
DE     10 2005 024 790 A1   12/2006
(Continued)

OTHER PUBLICATIONS

International Search Report for PCT/EP2013/064287 dated Oct. 22, 2013.
(Continued)

*Primary Examiner* — Robert E Fennema
*Assistant Examiner* — Marzia T Monty
(74) *Attorney, Agent, or Firm* — Seyfarth Shaw LLP

(57) ABSTRACT

Method for manufacturing a three-dimensional object by a layer-wise solidification of a building material at positions in the respective layer corresponding to the cross-section of the object to be manufactured by introducing energy by means of electromagnetic radiation, wherein a calculation, which stresses will occur inside of the object during the layer-wise manufacturing, is carried out and wherein the object to be manufactured obtains additional structures with respect to the required shape of the object to be manufactured when a critical value is exceeded.

11 Claims, 4 Drawing Sheets

Figure 1:
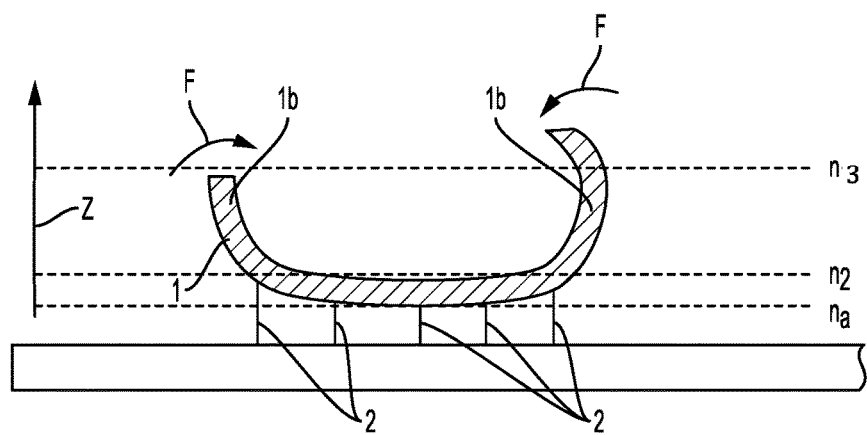

(51) Int. Cl.
*B29C 64/386* (2017.01)
*B33Y 50/02* (2015.01)

(58) Field of Classification Search
CPC .... B22F 5/003; B22F 1/0074; B29C 67/0077; B29C 67/0051; B29C 67/0055; B29C 67/0059; B29C 67/0062; B29C 67/0088; B29C 67/0092; B29C 35/00; B29C 35/08; B29C 41/12; B29C 41/36; B29C 41/48; B33Y 10/00; B33Y 50/02; B33Y 30/00; B33Y 70/00; B23K 26/34; B23K 26/04
USPC ....... 264/308, 401, 497, 40.1, 653; 700/119, 700/120, 97
See application file for complete search history.

(56) References Cited

U.S. PATENT DOCUMENTS

| | | | |
|---|---|---|---|
| 6,936,212 B1* | 8/2005 | Crawford | B28B 1/00 264/308 |
| 2004/0006405 A1 | 1/2004 | Chen | |
| 2007/0175875 A1 | 8/2007 | Uckelmann et al. | |
| 2008/0131104 A1 | 6/2008 | Philippi | |
| 2010/0042241 A1 | 2/2010 | Inoue | |
| 2013/0124151 A1* | 5/2013 | Mech | G06F 17/50 703/1 |

FOREIGN PATENT DOCUMENTS

| | | |
|---|---|---|
| DE | 10 2007 059 865 A1 | 6/2009 |
| EP | 1720676 | 11/2006 |
| EP | 2022622 | 2/2009 |
| WO | WO 2009039159 | 3/2009 |

OTHER PUBLICATIONS

Matsumoto et al., International Journal of Machine Tools and Manufacture 42, 2000, pp. 61-67.

* cited by examiner

METHOD AND DEVICE FOR PRODUCING A THREE-DIMENSIONAL OBJECT IN LAYERS

CROSS REFERENCE TO RELATED APPLICATIONS

This application is a national phase application of international application PCT/EP2013/064287, filed Jul. 5, 2013, which claims the benefit of German application DE 10 2012 013 318.9 filed Jul. 6, 2012, the disclosure of which is incorporated by reference in its entirety.

TECHNICAL FIELD

The invention refers to a method for manufacturing a three-dimensional object by a layer-wise solidification of a building material at those positions in the respective layer that correspond to the cross-section of the object to be manufactured by introducing energy by means of electromagnetic radiation and it refers to a device for carrying out the method.

In generic processes that apply a powder layer-wise, the energy that has been introduced at first leads to a—at least partial—liquefaction of the powder grains. When no further energy is introduced, the regions of liquefied material cool down and a solidification occurs.

One of the possible processes as well as a corresponding device for carrying out such a process are known under the name "Selective Laser Sintering" and are disclosed in DE 10 2005 024 790 A1. According to this document at first a thin layer of the building material in powder form is applied by means of an application device. Subsequently, this building material in powder form is solidified at the positions corresponding to the respective cross-section of the object by the action of a laser beam. These two steps are alternately repeated until the three-dimensional object to be manufactured has been finished.

Due to the alternation of the introduction of energy accompanied by a heating-up and the subsequent cooling-down phase stresses occur within the object. After the manufacturing process has been finished, the manufactured object is subjected to a heat treatment, by which heat treatment the stresses that occurred during the layer-wise building are reduced.

From DE 19511772 A1 it is known to manufacture a support structure for the object to be manufactured, said support structure connecting the object to be manufactured to a massive metal plate. This support structure reduces warpage of the object to be manufactured because the forces that occur in the object to be manufactured are opposed by corresponding holding forces.

The known support structures in the known prior art extend substantially perpendicularly from the stable plate to the object to be manufactured.

In objects, particularly in objects having an open cross-section, the problem arises that not all positions of the cross-section can be connected to a support structure.

In such objects internal stresses can lead to a deviation of the actual shape from the required shape.

From WO 2009/039159 A2 it is known to newly calculate and change the dimensions of the object to be manufactured for each layer of the manufacturing process in anticipation of a deviation during the manufacturing process in such a way that the effects of a material shrinking occurring in the manufacturing process can be compensated and the finished object has the target dimensions in spite of the material shrinkage. In this process the high computational effort for re-calculating all layers of the object to be manufactured is disadvantageous.

A further disadvantage of this method is seen in stresses remaining in the object and possibly leading later on, e.g. in a heat treatment, to a deformation. From EP 1 720 676 B1 it is furthermore known to calculate a compensation record and/or a compensation function from the target value data and, if applicable, from at least one manufacturing parameter before the start of the free form sintering and/or melting process and to link the compensation record to the product target geometry record and apply the compensation function thereon, respectively, in order to generate the control record.

BRIEF DESCRIPTION OF THE INVENTION

The considerations that led to the present invention adopt the finding that in a layer-wise building of objects the magnitude of the internal stresses depends on the volume of the object to be manufactured. As this volume successively increases with each new layer, it can be calculated in advance, at which layer the occurring internal stresses begin to be so large that a deformation of the part will result if no countermeasures are taken preemptively.

According to the invention these countermeasures are configured such that the part to be manufactured as compared to the targeted shape of the object to be manufactured is provided with additional structures. These additional structures after the heat treatment of the completely manufactured object can be removed therefrom or—in case the additional structure does not interfere with the functionality of the object—may remain at the object. For example, an additional structure that is located in an internal cavity of the object, may remain therein.

Inherent to the principle of a layer-wise construction, wherein layers are arranged onto one another in Z direction perpendicularly to the layer planes, during the manufacturing process the objects—at least temporarily—do have a cross-section in a plane that contains the Z axis or is parallel to the Z axis, which cross-section is designated by the skilled person as "open". For example, an object having a cross-section with "O"-shape after its completion, and thus is "closed", during its manufacturing process has an "open", approximately "u"-shaped cross-section. In this phase of the manufacturing process such an object is vulnerable to a warpage resulting from internal stresses. Of course, the invention is not limited to objects having an "O"-shaped profile. The depiction "O"-shaped only serves for a simple illustration of an object shape for which there occur internal stresses in the material, which however do not lead to a deformation of the object.

In an object having an "open" cross-section the internal stresses more frequently lead to a deformation of the manufactured object, whereas in an object having a closed cross-section, the internal stresses lead to a substantially smaller deformation.

This finding was used in a novel and inventive way for developing the claimed manufacturing method, in which by the additional structure an "open" cross-section obtains the positive properties of a "closed" cross-section, for which the internal stresses are in equilibrium, during the manufacturing process.

According to the method of the invention when manufacturing an object having an open profile, at least one additional stiffening element is created that absorbs forces occurring due to the internal stresses in such a way that no deformation or a minimal deformation of the object to be manufactured results. By the additional provision of a stiffening element, the open profile of the object to be manufactured obtains an increased stability against deformation.

Figure 2:
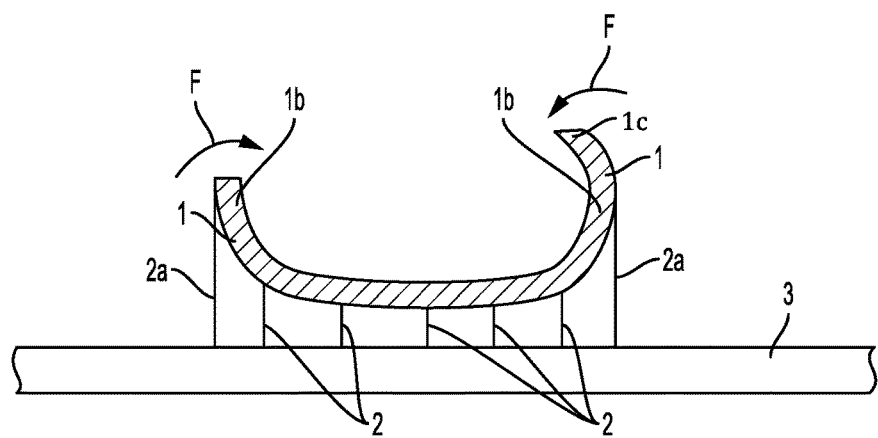
Figure 3:
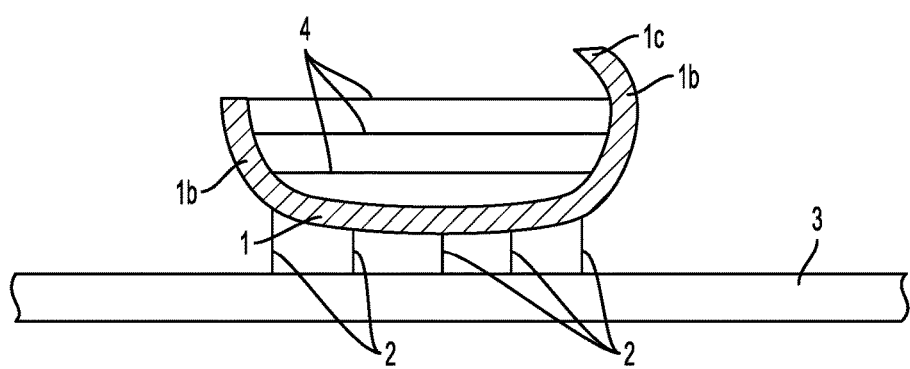
Figure 4:
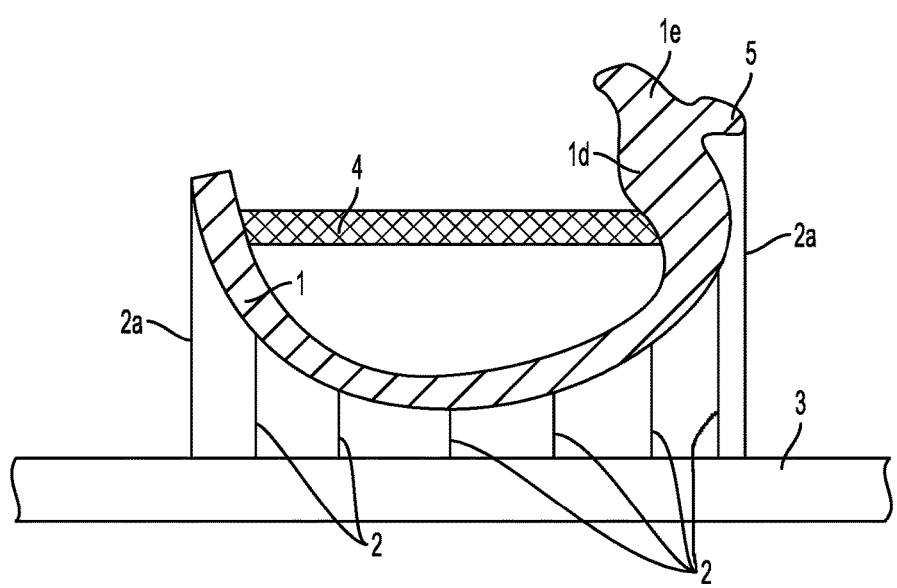

In the following the invention will be further explained based on the figures, which respectively show:

FIG. 1 and FIG. 2 an object to be manufactured having support structures according to the prior art in a sectional view, FIG. 3 and FIG. 4 an object to be manufactured having inventive additional structures.

The object 1 to be manufactured was manufactured layer-wise in a known way by a selective melting and subsequent solidification of a material in powder form. The object 1 is surrounded at all sides by loose powder in a known way. The object 1 is connected to a base plate 3 via a support structure 2.

The manufacturing process starts by applying a first powder layer onto the base plate 3. In this first layer the selective melting and cooling-down starts at those positions that correspond to the cross-section of the support structure 2. This process is repeated for a multitude of layers. The respective layers are arranged onto one another in the direction of the axis Z. The manufacturing of the object 1 as such starts at a certain number of layers.

In order to make clear the manufacturing process, it is noted that during the layer-wise manufacturing process the transition from the base plate 3 to the support structure 2 and from the support structure 2 to the object 1 occurs without interruption. Thereby, a form-locking connection between the base plate 3 and the object 1 is achieved.

The object 1 to be manufactured starts approximately at layer n1. In Z direction, approximately up to layer n2, the object 1 has a cross-section that is formed to be flat in the region 1a. Approximately from layer n2 to layer n3 the region 1b, which is designated by 1b, runs substantially vertically upwards.

By the frequent heating and cooling-down processes that occur for each layer n, an internal stress arises in the object 1, which internal stress induces a force F in the direction of the arrow F. This force F can disadvantageously lead to a deformation of the regions 1b of the object 1.

The method calculates the force F considering the partial volume of the object 1 that has been solidified in the previous layers as well as the partial volume of the object 1 that will be solidified in the following layers.

FIG. 2 shows a solution according to the prior art, in which the support structure 2 that starts at the base plate 3 has additional structure elements 2a, which end at the region 1b of the object 1. These structure elements 2a can absorb tensile forces, which are opposed to the force P, and thus are able to counter the deformation of the object 1. The structure elements 2a run substantially perpendicularly from the base plate 3 to the object 1.

Depending on the shape of the object 1 to be manufactured it may occur that regions of the object 1 cannot be reached by the upward running structure elements 2a. In the object 1 shown in FIG. 2 this is the region 1c.

FIG. 3 shows an embodiment according to the invention in which the object 1 is connected to the bottom plate 3 via the support structure 2 in the usual way. According to the invention several additional structures 4 have been manufactured, which are generated substantially horizontally and thus substantially in parallel to the layers. In the example as shown, the manufacturing of the respective additional structures 4 in each case already started in a layer, in which an internal stress leading to a deformation in the object 1 does not yet occur.

Due to the layer-wise manufacturing principle, the horizontal additional structures 4 themselves need to have perpendicular support elements in order to guarantee a manufacturability. In the example as shown, several additional structures 4 are arranged above one another. These additional structures 4 are supported cascadingly on one another by perpendicular support elements. However, due to clarity reasons, an illustration of the perpendicular support elements is dispensed with.

If now during the course of the further manufacturing process the internal stress occurs that has been calculated in advance, the additional structures 4 that are already present will prevent a deformation of the object 1. If necessary, due to the additional structures 4 advantageously also the number of structure elements 2a may be reduced.

FIG. 4 shows a modification of the object 1. The region 1d has a volume that is comparatively large with respect to the other regions of the object 1. Therefore the calculated internal stresses are higher in the region 1d than in the remaining regions of the object 1. Accordingly, the additional structure 4 is designed to be comparatively massive.

According to the method of the invention, in general the dimensions of the additional structures 4 are calculated such that as few material as necessary is used albeit the additional structures are always sufficiently stable.

The region 1e projects above the other regions of the object 1 and therefore it is not possible to support this region 1e by a horizontal additional structure 4. In addition, the region 1e is inclined inwards, i.e. is unreachable for a structure element 2a that is extending perpendicularly from the base plate 3.

For such applications according to the method of the invention an additional structure 5 is generated, by which the object 1 is augmented such that the additional structure 5 can be reached by a structure element 2a rising perpendicularly from the base plate 5.

This additional structure 5 is removable after the heat treatment of the completed object 1.

The method is applied in a device that solidifies material layer-wise in a selective way. The device comprises a base plate (3), onto which the object (1) is built layer-wise, a device by which material can be provided layer-wise on the base plate or a previously provided layer of the material, an energy source by which energy can be introduced into a previously applied layer of the building material and a control unit for controlling the provision of a layer and the introduction of energy.

The calculation, at which positions the additional structures 4 and 5 shall be attached at the object 1, is done by a computer program. This computer program controls a control unit having a CPU. The control unit on its part controls the introduction of energy by means of electromagnetic radiation, wherein the powder is solidified by the action of a laser beam at the positions corresponding to the respective cross-section of the object.

In a further development of the invention, a predetermined deformation of the object that the object has after the layer-wise manufacturing may be intended. Such a functional deformation is calculated in advance such that the geometry of the object 1 has this deformation before the cooling-down and removal from the powder bed. Moreover, the deformation is determined in advance such that the object shows the desired geometrical result, i.e. its required shape, after a subsequent heat treatment.

In this case, when calculating the deformation based on the stresses occurring inside of the object 1, not only the volume and partial volumes, respectively, of the object 1 may be entered, but in addition thereto further processes that occur after a solidification of the last layer of the object 1 may be entered into the calculation. For instance, the cooling-down of the object 1, the removal of the support structure 2, of the structure elements 2a and/or of the additional structures 4, 5 as well as a heat treatment belong to these processes.

In a still further development of the invention after the layer-wise manufacturing of the object 1 the vertical, i.e. in Z direction, running support structures 2 and the structure elements 2a are separated from the base plate 3. Then, a heat treatment is carried out on the separately existing object. Here, the remaining additional structures 4, 5 are an additional reinforcement for the object 1 and prevent a deformation of the object 1 during the heat treatment. Thereby, the additional structures prevent or minimize a deformation, in particular a warpage during the heat treatment. Here, the additional structures can be predetermined in such a way that a possible deformation of the object to be manufactured during a heat treatment is prevented or minimized. The additional structures 4, 5 are removed only after the heat treatment, wherein an additional structure that does not interfere with the functionality of the object, may well remain at the object.

The invention claimed is:

1. A method for manufacturing a three-dimensional object by additive manufacture through layer-wise solidification of a powder building material at positions in respective consecutively made layers corresponding to horizontal cross-sections of the object to be manufactured, comprising the steps of:

calculating which stresses will occur inside of the object during the layer-wise solidification and determining one or more critical stress values for the object for each layer;

generating one or more support structures for the object to be manufactured in addition to a required shape of the object to be manufactured, the support structures being created during the build process in accordance with a critical stress value being exceeded in the calculation step, including calculating a shape of and position at which an additional structure is attached to the object, all of which is determined before the manufacturing of the object, a support structure being likewise made in layerwise solidification of the building material at positions in respective layers corresponding to horizontal cross-sections of the support structure;

wherein the calculation includes a total volume of the object, specific building material properties, and at least one of a partial volume of the object that would be presented in underlying layers and a partial volume of the object that would be presented by not yet manufactured layers;

solidifying the building material in consecutive layers corresponding to horizontal cross-sections of the object and support structure in a respective layer using electromagnetic radiation including repetitive steps of (i) depositing a layer of build material in a build area to be solidified, (ii) then solidifying that layer according to its corresponding cross-section (iii) repeating steps (i) and (ii) until the object is built.

2. The method according to claim 1, wherein the calculating step includes generating one or more support structures which yield no deformation or a minimized deformation of the object due to stresses occurring inside of the object.

3. The method according to claim 1, wherein the object, once manufactured, is subjected to a heat treatment after the completion of the last layer used in building the object, thereby removing heat treatment stresses inside of the object.

4. The method according to claim 3, wherein the support structures are determined such that they prevent or minimize a deformation of the object during the heat treatment.

5. The method according to claim 1, wherein the calculating step includes a predetermined deformation of the object, which the object would have after the completion of the last layer of its layer-wise manufacturing in the absence of any support structure.

6. The method according to claim 1, wherein the support structures are removed from the manufactured object.

7. The method according to claim 1, wherein a support structure which is located in an internal cavity of the object, remains in the internal cavity.

8. The method according to claim 1, wherein a support structure contains elements that run substantially horizontally in a layer.

9. The method according to claim 1, wherein an object, which has a cross-section that is closed in a plane containing the Z axis or a plane in parallel to the Z axis and in which during the manufacturing process due to that type of process a cross-section exists that is open with respect to the plane containing the Z axis or the plane in parallel to the Z axis, also has a closed cross-section during the manufacturing process by using at least one stiffening element as additional structure.

10. The method according to claim 1, further comprising freeing the object from the support structures provided in a Z direction after the completion of the last layer and subjecting the object to a heat treatment as a separate part.

11. The three-dimensional object manufactured by the method of claim 1.

* * * * *